United States Patent Office 3,410,838
Patented Nov. 12, 1968

3,410,838
PROCESS FOR REMOVAL OF ASH-FORMING CATALYST RESIDUE FROM TERMINALLY REACTIVE POLYMERS
Charles W. Strobel, Borger, Tex., assignor to Phillips Petroleum Company, a corporation of Delaware
No Drawing. Filed Feb. 14, 1964, Ser. No. 344,806
1 Claim. (Cl. 260—94.7)

ABSTRACT OF THE DISCLOSURE

In the production of carboxy-terminated polymers from the corresponding alkali metal salts by treatment with anhydrous hydrogen chloride, ash is removed from the polymer by dispersing a small quantity of water to the acidified polymer solution, and subsequently contacting the resulting mixture with anhydrous calcium chloride.

This invention relates to new and useful polymeric materials and a process for their preparation. In one aspect this invention relates to the preparation of carboxy-terminated polymers from the corresponding alkali metal salts. In another aspect the invention relates to the reduction of the ash content of polymerization mixtures containing inorganic components which form halogen derivatives which are insoluble in the polymerization mixture. In a further aspect the invention relates to a method of reacting an alkali metal salt of a carboxy-telechelic polymer with an anhydrous hydrogen halide to convert the alkali metal salt of the telechelic polymer to the corresponding acid and subsequently removing the alkali metal halide therefrom.

The term "telechelic" has been coined to define terminally reactive polymers. As used in this application, the term "telechelic polymers" means polymers of vinylidene-containing monomers which contain reactive groups such as the carboxy group on each end of the polymer molecule.

High ash content in polymers is undesirable since it renders the polymer unsuitable for many applications. It frequently causes clouding of an otherwise transparent polymer, and in the case of liquid polymers presents difficulties in film formation and adhesion and imparts undesirable properties to compositions in which these polymers are employed as plasticizers or binders for solid compositions. Therefore, it is highly desirable in the production of polymers to remove the ash-forming materials therefrom. However, the use of conventional washing steps to remove ash-forming salts has been found to be unsatisfactory since the addition of relatively large amounts of water to the system results in formation of an emulsion which is difficult to separate.

I have now found that carboxy-terminated polymers can be produced from their corresponding alkali metal salts with a significant reduction in ash content thereof by dispersing into the acidified carboxy-terminated polymer solution a small amount of water followed by contacting the resulting mixture with anhydrous calcium chloride.

Accordingly, it is an object of this invention to provide an improved process for the preparation of useful polymeric materials. Another object of the invention is to provide terminally reactive polymers having improved properties. Still another object of the invention is to provide an improved method for preparing carboxy-terminated polymers from their corresponding alkali metal salts. A further object is the reduction in ash content of carboxy-terminated polymers. A still further object is to provide an improved method for removing the alkali metal components from a polymer prepared in the presence of an organo polyalkali metal initiator.

Other objects, advantages and features of the invention will be readily apparent to those skilled in the art from the following description and the appended claims.

According to this invention a process is provided for reducing the ash content of a carbonated polymerization mixture containing inorganic components which form halide derivatives insoluble in the polymerization mixture by treating with anhydrous hydrogen halide gas, dispersing a small amount of water therein, and subsequently contacting the resulting mixture with anhydrous calcium chloride.

The monomers which can be employed in the preparation of the terminally reactive polymers include a wide variety of materials. Preferred monomers are the conjugated dienes containing from 4 to 12 carbon atoms and preferably from 4 to 8 carbon atoms, such as 1,3-butadiene
1,3-pentadiene (piperylene)
2-methyl-1,3-pentadiene
2-methyl-1,3-butadiene (isoprene)
2-phenyl-1,3-butadiene
3,4-dimethyl-1,3-hexadiene
4,5-diethyl-1,3-octadiene and the like. Of the conjugated dienes the preferred material is butadiene, with isoprene and piperylene also being especially suitable. In addition to the conjugated dienes, other monomers which can be employed are aryl-substitued olefins, such as styrene, various alkyl styrenes, para-methoxystyrene, vinylnaphthalene, and the like; heterocyclic nitrogen-containing monomers, such as pyridine and quinoline derivatives containing at least one vinyl group, such as 2-vinylpyridine
4-vinylpyridine
3,5-diethyl-4-vinylpyridine and the like; similar mono- and di-substituted alkenyl pyridines and like quinolines; acrylic acid esters, such as methyl acrylate and ethyl acrylate; alkacrylic acid esters such as vinylfuran, N-vinylcarbazole, and the like.

The above compounds in addition to being polymerizable alone are also copolymerizable with each other and may be copolymerized to form terminally reactive polymers. In addition, copolymers can be prepared using minor accounts of copolymerizable monomers containing more than one vinylidene group, such as 2,4-divinylpyridine
divinylbenzene
2,6-divinylpyridine
2,4-divinyl-3-methylpyridine
2,4-divinyl-5-ethylpyridine and the like.

The terminally reactive polymers, in addition to including homopolymers and copolymers of the above materials, also include block copolymers, which are formed by polymerizing a monomer onto the end of a polymer, the monomer being introduced in such a manner that substantially all of the co-reacting molecules enter the polymer chain at this point. In general, the block copolymers can include combinations of homopolymers and copolymers of the materials hereinbefore set forth. A detailed description of block copolymers containing terminally reactive groups and their method of preparation is set forth in the copending application of R. P. Zelinski, Ser. No. 737,213, filed May 23, 1958, now abandoned.

The terminally reactive polymers are prepared by contacting the monomer or monomers which it is desired to polymerize with an organo alkali metal compounds, including mono- and polyalkali metal compounds. The organo alkali metal compounds preferably contain from 1 to 4 alkali metal atoms, and those containing 2 alkali metal atoms are more often employed. As will be explained hereinafter, lithium is the preferred alkali metal.

The organo alkali metal compounds can be prepared in several ways, for example by replacing halogens in an organic halide with alkali metals, by direct addition of alkali metals to a double bond, or by reacting an organic halide with a suitable alkali metal compound.

The organo alkali metal compound initiates the polymerization reaction, the organo radical being incorporated in the polymer chain and the alkali metal being attached terminally at each end of the polymer chain. The preferred polymers in general will be linear polymers having two terminally reactive groups; however, polymers containing one or more such groups can be prepared. The general reaction can be illustrated graphically as follows:

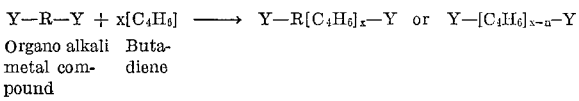

or combinations thereof.

A specific example is:

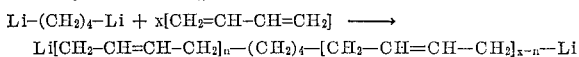

In the specific example, 1-4-addition of butadiene is shown; however, it should be noted that 1,2-addition also can occur.

While organo compounds of the various alkali metals can be employed in carrying out the polymerization, by far the best results are obtained with organolithium compounds which give very high conversions to the terminally reactive polymer. With organo compounds of the other alkali metals, the amount of monoterminally reactive polymer, that is, polymer having alkali metal at only one end of the chain, is substantially higher. The alkali metals, of course, include sodium
potassium
lithium
rubidium and
cesium, The organic radical of the organo alkali metal compound can be an aliphatic, cycloaliphatic or aromatic radical. For example, di- and polyalkali metal substituted hydrocarbons can be employed, including n-butyllithium,
tertbutyllithium,
amylpotassium,
isopropylcesium,
n-decyllithium,
phenyllithium,
naphthyllithium,
1,4-dilithiobutane,
1,5-dipotassiopentane,
1,4-disodio-2-methylbutane,
1,6-dilithiohexane,
1,10-dilithiodecane,
1,15-dipotassiophentadecane,
1,20-dilithioeicosane,
1,4-disodio-2-butene,
1,4-dilithio-2-methyl-2-butene,
1,4-dilithio-2-butene
1,4-dipotassio-2-butene,
dilithionaphthalene,
1,4-dilithiomethylnaphthalene,
disodionaphthalene,
4,4-dilithiobiphenyl,
disodiophenanthrene,
dilithioanthracene,
1,2-dilithio-1,1-diphenylethane,
1,2-disodio-1,2,3-triphenylpropane,
1,2-dilithio-1,2-diphenylethane,
1,2-dipotassiotriphenylethane,
1,2-dilithiotetraphenylethane,
1,2-dilithio-1-phenyl-1-naphthylethane,
1,2-dilithio-1,2-dinaphthylethane,
1,2-disodio-1,1-diphenyl-2-naphthylethane,
1,2-dilithiotrinaphthylethane,
1,4-dilithiocyclohexane,
2-4-disodioethylcyclohexane,
3,5-dipotassio-n-butylcyclohexane,
1,3,5-trilithiocyclohexane,
1-lithio-4-(2-lithiomethylphenyl)butane,
1,2-dipotassio-3-phenylpropane,
1,2-di(lithiobutyl)benzene,
1,3-dilithio-4-ethlbenzene,
1,4-dirubidiobutane,
1,8-dicesiooctane,
1,5,12-trilithiododecane,
1,4,7-trisodioheptane,
1,4-di(1,2-dilithio-2-phenylethyl)benzene,
1,2,7,8-tetrasodionaphthalene,
1,4,7,10-tetrapotassiodecane,
1,5-dilithio-3-pentyne,
1,8-disodio-5-octyne,
1,7-dipotassio-4-heptyne,
1,10-dicesio-4-decyne,
1,11-dirubidio-5-hendecyne,
1,2-disodio-1,2-diphenylethane,
dilithiophenanthrene,
1,2-dilithiotriphenylethane,
1,2-disodio-1,2-diphenylethane,
dilithiomethane,
1,4-dilithio-1,1,4,4-tetraphenylbutane,
1,4-dilithio-1,4-diphenyl-1,4-dinapthylbutane, and the like.

While the organo dialkali metal initiators in general can be employed, certain specific initiators give better results than others and are preferred in carrying out the preparation of the terminally reactive polymers. For example, of the condensed ring aromatic compounds, the lithium-methylnaphthalene adduct is preferred, but the adducts of lithium with anthracene and biphenyl can be employed with good results. Of the compounds of alkali metals with polyaryl substituted ethylenes, the preferred material is 1,2 - dilithio - 1,2 - diphenylethane(lithium-stilbene adduct). One reason why certain of the organo dialkali metals are more effective than others lies in the difficulty of preparing the pure organo dialkali metal compounds. In many instances, the compounds which are formed are mixtures of mono- and dialkali metal compounds, which are less effective in promoting the formation of the terminally reactive polymers. The organo dialkali metal compounds which have been set forth as being preferred are those which when prepared contain a minimum of the monoalkali metal compound.

The amount of initiator which can be used will vary depending upon the polymer prepared, and particularly the molecular weight desired. Polymers of any desired molecular weight can be treated by the inventive process, including both liquid and solid materials. Usually the terminally reactive polymers are liquids, having molecular weights in the range of 1,000 to about 20,000. However, depending on the monomers employed in the preparation of the polymers and the amount of initiator used, semisolid and solid terminally reactive polymers can be prepared having molecular weights up to 150,000 and higher. When the terminally reactive polymers are subjected to curing or reaction with polyfunctional compounds, materials of still higher molecular weight are obtained.

Formation of the terminally reactive polymers is generally carried out in the range of between —100 and 150° C., preferably between —75 and 75° C. The particular temperature employed will depend both upon the monomers and the initiators used in preparing the polymers. For example, it has been found that the organodilithium initiators provide more favorable results at elevated temperatures whereas lower temperatures are required to effectively initiate polymerization to the desired products with the other alkali metal compounds. While usually the initiator used is in amounts between about 0.25 and about 100 millimoles per 100 grams of monomer, the amount of catalyst employed can vary over a broad range and is preferably in the range of between about 1 and about 30 millimoles per 100 grams of monomer.

It is preferred that the polymerization be conducted in the presence of a suitable diluent such as benzene, toluene cyclohexane, methylcyclohexane, xylene, n-butane, n-hexane, n-heptane, isooctane, mixtures of these and the like. Generally the diluent is selected from hydrocarbons, e.g., paraffins, cycloparaffins and aromatics containing from 4 to 10 carbon atoms per molecule. As stated previously, the organodilithium compounds are preferred as initiators in the polymerization reaction since a very large percentage of the polymer molecules formed contain two terminally reactive groups, and also the polymerization can be carried out at normal room temperature. This is not to say, however, that other organo alkali metal initiators cannot be employed; however, usually more specialized operation or treatment is required with these materials, including low reaction temperatures. Since it is desirable to obtain a maximum yield of terminally reactive polymer, it is within the scope of the invention to use separation procedures, particularly with alkali metal initiators other than lithium compounds, to separate terminally reactive polymer from the polymer product.

The terminally reactive polymers contain an alkali metal atom on each end of the polymer chain and the organic radical of the initiator is present in the polymer chain. These terminally reactive polymers can be treated with reagents to introduce various reactive groups in place of the alkali metal atoms. In the preparation of carboxy-terminated polymers from the corresponding alkali metal salts, the polymers are first treated with carbon dioxide by a suitable method such as by pouring the polymer solution onto dry ice or by injecting carbon dioxide gas and polymer solution under pressure into separate arms of a T-tube which provides a means for bringing the gas into contact with the polymer, and the resulting alkali metal salts are treated with anhydrous hydrogen chloride gas. The reactions which take place are typified by the following equation, wherein P designates a polymer chain:

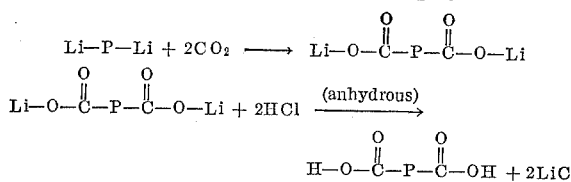

Polymers produced in the presence of organic polyalkali metal initiators such as organolithium initiators generally have an undesirably high ash content unless special methods are employed for its removal. By this invention, a practical and very convenient method has been found for removing ash from carboxytelechelic polymers prepared as above. After carbonation of the polymer solution and treatment with anhydrous hydrogen chloride, a small amount of water is added, the mixture is agitated to obtain an intimate dispersion and is then contacted with anhydrous calcium chloride.

The amount of water added to the polymer solution must be kept at a low level. It will generally be in the range of 0.5 to 15 grams per 100 grams of polymer, and best results are often obtained when the amount of water is less than 10 grams per 100 grams of polymer.

When practicing the process of this invention, it is convenient to pass the polymer solution through a bed of the drying agent. The amount of ash removed from the polymer will depend upon the efficiency of contact with the drying agent and will be determined to a large extent by the amount of water present, the mesh size of the drying agent, the length of the bed, and the rate of passage of the solution therethrough.

One requirement of the drying agent is that it will not react with the carboxy groups in the polymer. For this reason it is preferred that it be substantially neutral or acidic. Anhydrous calcium chloride has been found to be particularly effective for the process herein disclosed.

While the invention has been described chiefly in connection with carboxy-terminated polymers, it is applicable also, in manner similar to that described for thhe carboxy-terminated polymers, to the preparation of polymers containing acidic groups such as —POOH, $SO_3H$, and the like and to polymers containing mercapto and hydroxy groups.

The following examples are presented to further illustrate the invention, but it is not intended that the invention should be limited thereto.

EXAMPLE I

Preparation of polymer

A liquid carboxy-telechelic polymer was prepared by the polymerization of 1,3-butadiene in the presence of a lithium-methylnaphthalene isoprene initiator solubilized with butadiene. The following recipe for preparing the initiator was employed:

| | Moles |
|---|---|
| Lithium pellets | 2.6 |
| Mixed methylnaphthalenes [1] | 1.0 |
| Isoprene | 1.5 |
| 1,3-butadiene | 5.0 |
| Diethylether | 4.5 |

[1] Obtained from the Reilly Tire and Chemical Company.

Diethylether was charged to the reactor followed by the lithium pellets and then the methylnaphthalenes. The mixture was agitated at 0° C. until the reaction was complete, after which the temperature was lowered to about —20 to —50° F. and isoprene was introduced, keeping the maximum temperature below 10° F. by stopping addition as necessary to allow time for the temperature to drop. When isoprene addition was complete, butadiene was introduced, the maximum temperature being held below 20° F. by interrupting addition as with the isoprene. The mixture was then titrated for total alkalinity to determine conversion of methylnaphthalenes. Any excess, or superalkalinity, was reacted with butadiene in the same mole ratio as in the original recipe. The finished initiator was then transferred to a storage vessel where the temperature was kept at —15° F. or lower. Total alkalinity on the finished initiator served as the basis for determining the catalyst charge to the polymerization recipe.

Polymerization was carried out in a 1000-gallon stainless steel reactor using the following recipe:

| | |
|---|---|
| 1,3-butadiene, parts by weight | 100 |
| Cyclohexane, parts by weight | 1350 |
| Initiator, mmoles [1] | 28 |

[1] Conversion, percent of naphthalene, when preparing the initiator was 125. After addition of the butadiene, the initiator was aged 26.4 hours.

Cyclohexane was charged to the reactor and heated to 130° F. The initiator was then charged and was followed immediately by the butadiene. Polymerization temperature was controlled between 122° F. and 128° F. When conversion of butadiene was 100 percent, as indicated by solids determination, one part by weight of tetrahydrofuran was added to the reactor to reduce viscosity and facilitate carbonation. The batch was then cooled to 40° F. and carbonated at blowdown through a 1.5-inch Pownell mixing T. The carbonated polymer solution was discharged from the mixing T into a 2000-gallon glass-lined blowdown tank. After blowdown was complete the batch was acidified with anhydrous hydrogen chloride to convert the lithium salt to carboxy groups. The solution contained approximately 7 grams of polymer per 100 ml. of solution. The polymer had a poise viscosity at 25° C. of 334 and a carboxy content of 1.80 weight percent.

EXAMPLE II

A liquid carboxy-telechelic polymer was prepared by polymerization of 1,3-butadiene in the presence of a lithium-methylnaphthalene-isoprene initiator solubilized with butadiene in the manner described in Example I. The polymer solution was carbonated and then treated (acidified) with anhydrous hydrogen chloride to convert the lithium salt to carboxy groups. The solution contained approximately 7 grams of polymer per 100 milliliters of solution. The polymer had a poise viscosity at 25° C. of 334 and a carboxy content of 1.80 weight percent.

Two samples of the acidified polymer solution were reserved as controls. Variable amounts of water were added to three samples. The solvent was distilled from one of the controls and the ash content determined. The remaining samples were allowed to percolate through a vertical bed of anhydrous calcium chloride in a 100-milliliter burette. The lower portion of the bed consisted of 30 ml. of 40-mesh calcium chloride and the upper portion consisted of 10 ml. of 8-mesh calcium chloride. Solvent was removed from each of the resulting solutions and the ash content determined. The following results were obtained:

| Run No. | Water Added | | Ash Content, Wt. Percent |
|---|---|---|---|
| | Ml./100 Ml. Polymer Solution | Grams/100 Grams Polymer | |
| (a) | | | 2.64 |
| 2 b | | | 2.48 |
| 3 | 0.25 | 3.5 | 0.86 |
| 4 | 0.50 | 7.1 | 1.09 |
| 5 | 1.00 | 14.3 | 2.10 | a Solvent distilled after polymer solution was treated with anhydrous HCl.
b Solution passed through CaCl₂ after HCl treatment.

The data show reduction in ash content when the inventive method was used for treatment of the polymer solution. No significant amount of ash was removed if water was not present. The effect obtained by the addition of a small amount of water was, therefore, entirely unexpected.

Various modifications of this invention can be made, or followed, in view of the foregoing disclosure, without departing from the spirit or scope thereof.

I claim:
1. A process for the removal of ash-forming catalyst residues from a carboxy terminated polymer of at least one conjugated diene having from 4 to 12 carbon atoms per molecule which comprises admixing with said carboxy terminated polymer having the catalyst residues therein, an amount of water in the range of from 0.5 to 15 grams per 100 grams of polymer contacting the resulting mixture of polymer, catalyst residues and water with anhydrous calcium chloride and thereafter recovering the treated polymer essentially free of water and catalyst residues as a product of the process.

References Cited

UNITED STATES PATENTS 3,108,994  10/1963  Zelinski et al.

OTHER REFERENCES

Morton, Laboratory Technique in Organic Chemistry, McGraw-Hill (1938), copy in Group 140, pp. 1–5 relied on.

JOSEPH L. SCHOFER, *Primary Examiner.*

H. WONG, JR., *Assistant Examiner.*